United States Patent [19]
Padilla et al.

[11] Patent Number: 5,625,531
[45] Date of Patent: Apr. 29, 1997

[54] MOTOR CONTROL CENTER PILOT DEVICES BRACKET

[75] Inventors: Valerie R. Padilla; Tomas B. R. Mendez, both of Durham; Jeremy A. Palmer, Chapel Hill; Kevin F. Nolan, Hillsborough, all of N.C.

[73] Assignee: General Electric Company, New York, N.Y.

[21] Appl. No.: 548,031

[22] Filed: Oct. 25, 1995

[51] Int. Cl.$^6$ .................. H02B 1/26; H02B 1/01
[52] U.S. Cl. ........................ 361/623; 361/825
[58] Field of Search ................ 361/600–601, 361/605, 610, 614, 616, 623, 641, 657–658, 724, 825

[56] References Cited

U.S. PATENT DOCUMENTS

| | | | |
|---|---|---|---|
| 4,178,624 | 12/1979 | Wilson et al. | 361/614 |
| 4,305,114 | 12/1981 | Takagi et al. | 361/342 |
| 5,424,911 | 6/1995 | Joyner et al. | 361/616 |

*Primary Examiner*—Gregory D. Thompson
*Attorney, Agent, or Firm*—Richard A. Menelly; Carl B. Horton

[57] ABSTRACT

A Motor control center containing so-called "pilot" devices along with motor contactors and circuit interrupters mounts the pilot devices on a bracket that is received within the control center access door. The bracket is arranged to interact with the control center access door to automatically rotate the bracket in one direction when the access door is opened and to rotate the bracket in the opposite direction when the access door is closed.

10 Claims, 4 Drawing Sheets

5,625,531

MOTOR CONTROL CENTER PILOT DEVICES BRACKET

BACKGROUND OF THE INVENTION

Motor control centers generally contain pilot devices such as described in U.S. Pat. No. 4,305,114 entitled "Motor Control Center" for providing auxiliary functions along with motor protection and control. The electrical appliances used with the control center for auxiliary functions are mounted on a display panel which is rotated away from the motor center interior to access the motor protection and control components. The display panel must first be unscrewed from one end to allow the display panel to be rotated.

As disclosed in a more recent U.S. Patent, namely U.S. Pat. No. 5,424,911 entitled "Compact Motor Controller Assembly", the motor control center is often accessed to remove, inspect and repair the motor protection and control equipment. The pilot devices in the form of display lamps and push buttons, for example, are usually arranged behind the motor control center access door on a support bracket and can interfere with access to the wire and equipment located behind the support bracket. The support bracket along with the pilot devices must usually be disconnected to access the wire and equipment and later re-connected when the repair is completed.

It would be economically beneficial if the wire and equipment located behind the support bracket could be more readily accessed without requiring a substantial investment in time, especially when the equipment must be accessed upon the occurrence of a damaging overcurrent condition.

SUMMARY OF THE INVENTION

A motor control center includes a slotted access door for accessing the control center components. A pilot device bracket supports the auxiliary pilot devices used with the control center components and extends through the door slot. Opening the door automatically rotates the pilot device bracket away from the door slot and the interior of the control center to provide access to the control center components. Closing the door automatically rotates the pilot device bracket back into position within the door slot and in front of the control center components.

DESCRIPTION OF THE PREFERRED EMBODIMENT

Figure 1:
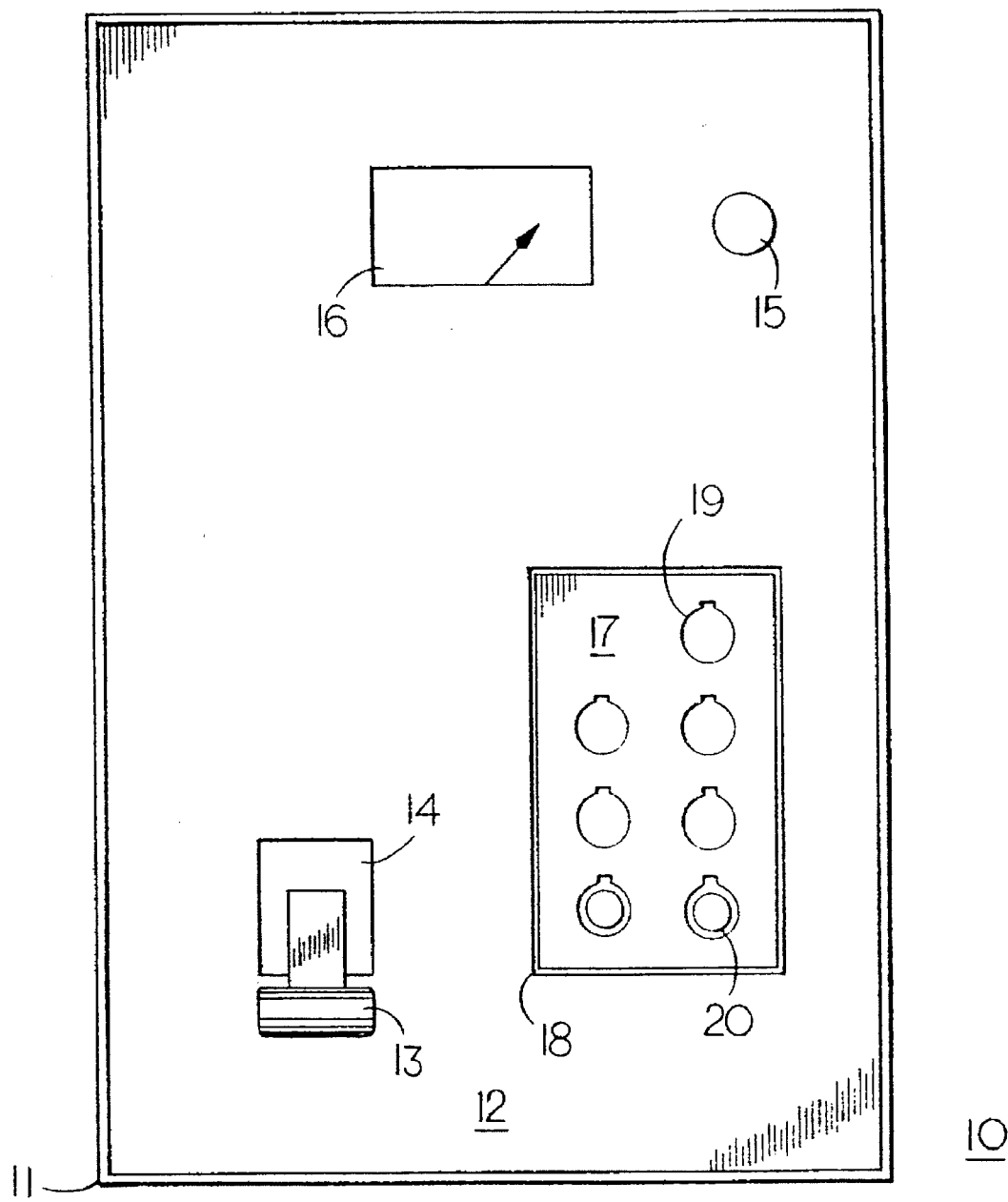
FIG. 1 is a front plan view of the motor control center according to the invention with the motor control center door in the closed position.

A motor control center 10, hereinafter "control center", is depicted in FIG. 1 and includes a cabinet 11 to which a door 12 is pivotally attached. The handle 13 within the handle support 14 allows the door to be translated between open and closed positions to access the interior motor control center components described in the aforementioned U.S. Pat. No. 4,305,114. The meter 16 arranged on the door depicts the circuit voltage and current while the indicating lamp 15 provides indication as to the whether the control center is electrically energized or the state of a contactor or other device. In accordance with the teachings of the invention, a pilot device bracket 17, hereinafter "pilot bracket" extends partially through a slot 18 in the control center door 12 and carries ground fault relays, phase unbalance relays, elapsed time meters, keypads, displays, indicating lamps 19 along with push buttons 20 for activating associated equipment and indicating the ON-OFF states of the equipment.

Figure 2:
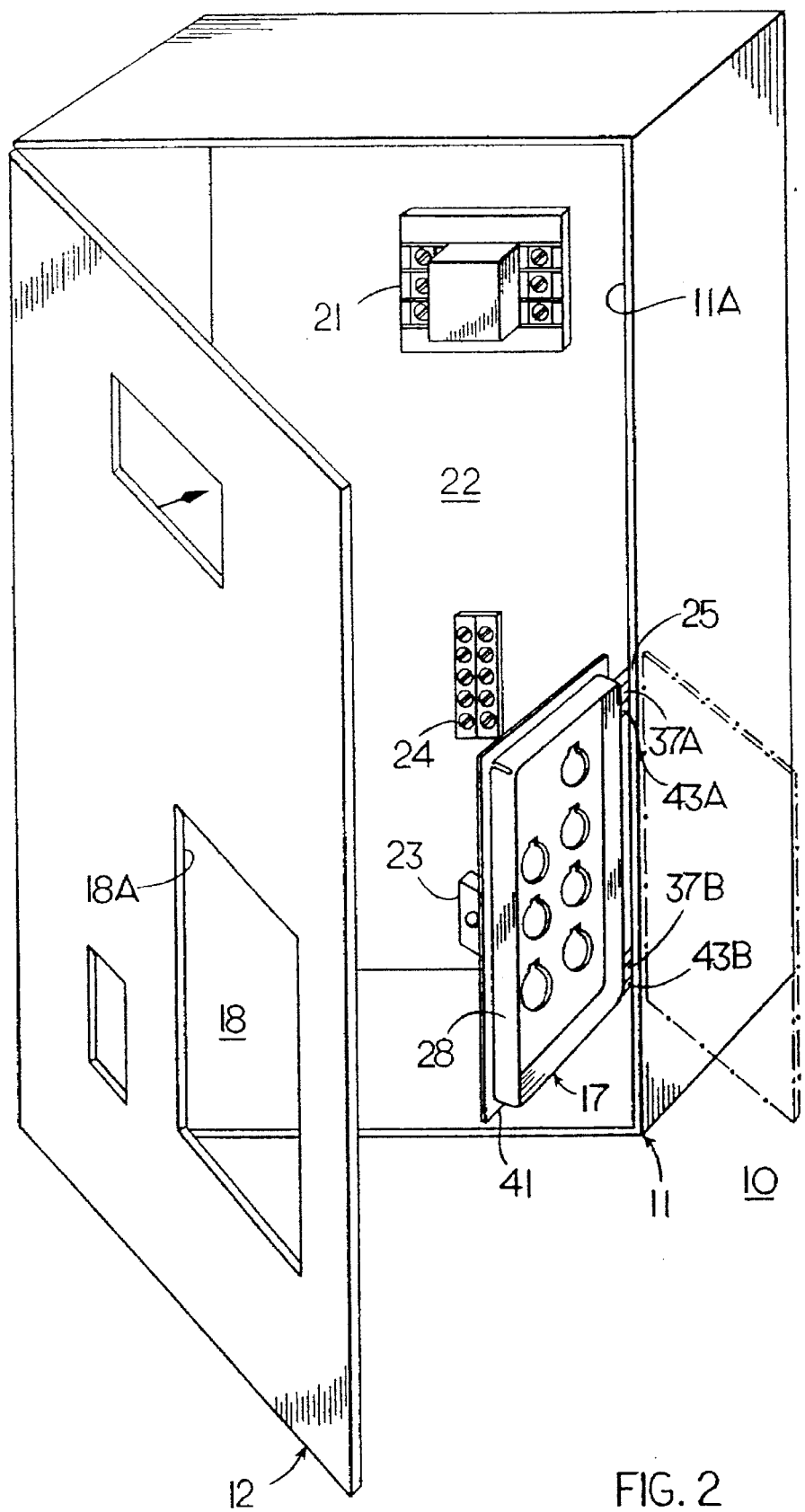
FIG. 2 is a front perspective view of the motor control center of FIG. 1 with the motor control center door in the opened position.

The control center 10 is shown in FIG. 2 with the control center door 12 open to reveal the internal components such as the motor contactor 21 attached to the back wall 22. The rotation of the pilot bracket 17 automatically occurs upon rotation of the control center door 12 to the open position by interaction between the edge of the rectangular slot 18 in the control center door 12 and the side extension 41 provided on the edge 28 of the pilot bracket 17 in the manner to be described below in greater detail. The rotation of the pilot bracket occurs immediately upon rotation of the control center door 12 to expose auxiliary control center components such as the current transformer 23 and the terminals 24 that are situated behind the pilot bracket 17 when the control center door is closed. The opposite edge 31 of the pilot bracket is pivotally-attached to the side wall 11A of the cabinet 11 by means of the top and bottom hinges 37A, 37B formed on the pilot bracket and the top and bottom hinge supports 43A, 43B attached to the front part of the side wall 11A. As indicated in phantom, the pilot bracket can be manually rotated to its completely open position to access the remaining auxiliary control center components, if required.

Figure 3:
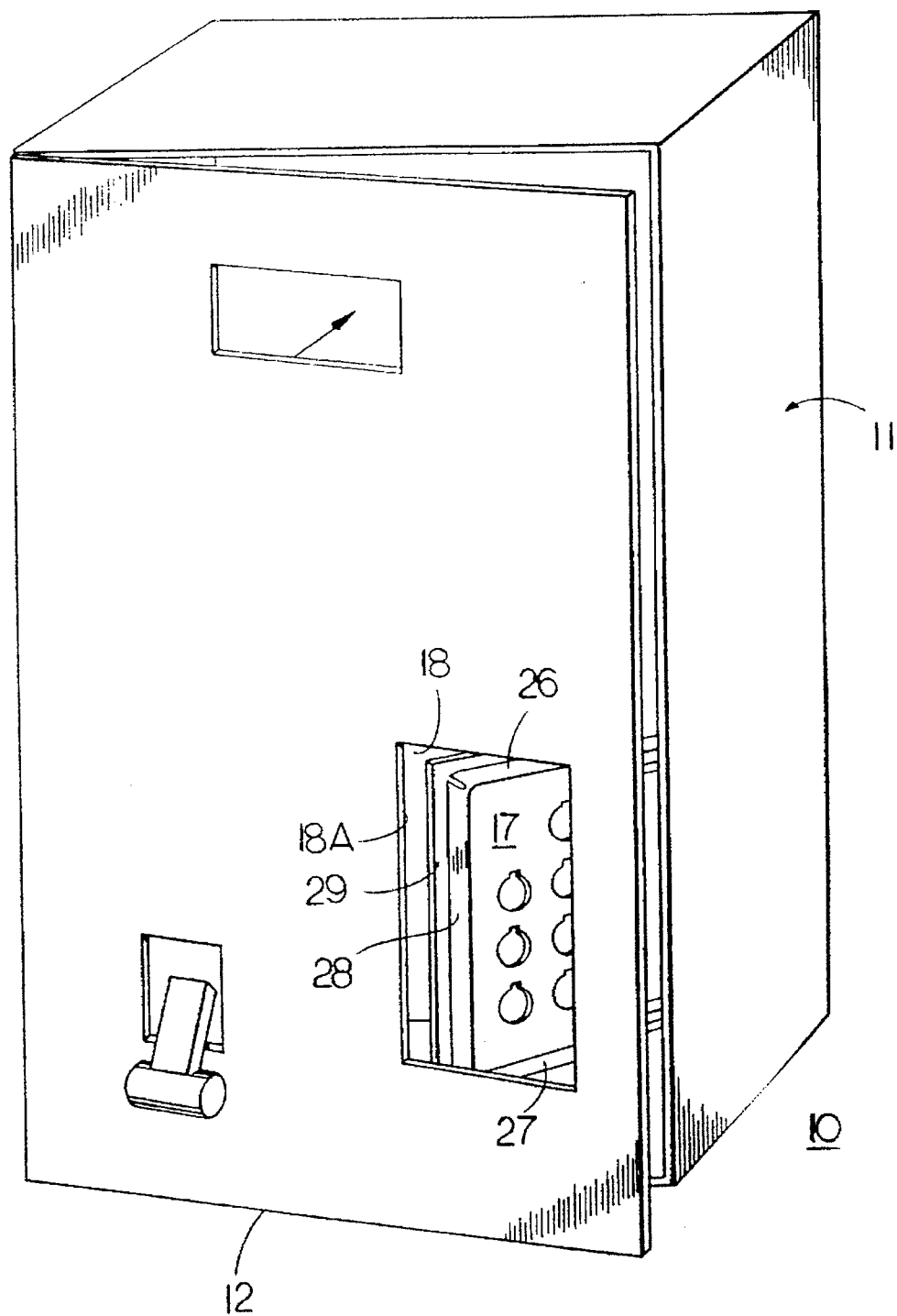
FIG. 3 is a is a front perspective view of the motor control center of FIG. 1 with the motor control center door in a partially closed position.

When the control center door 12 on the control unit 10 is first rotated in the closed direction as indicated in FIG. 3, the edge 18A of the rectangular slot 18 in door 12 becomes captured within the elongated groove 29 formed in the side edge 28 that extends from the top edge 26 to the bottom edge 27 along the perimeter of the pilot bracket 17. Further rotation of the door 12 conjointly rotates the pilot bracket to the closed position shown earlier in FIG. 1.

Figure 4:
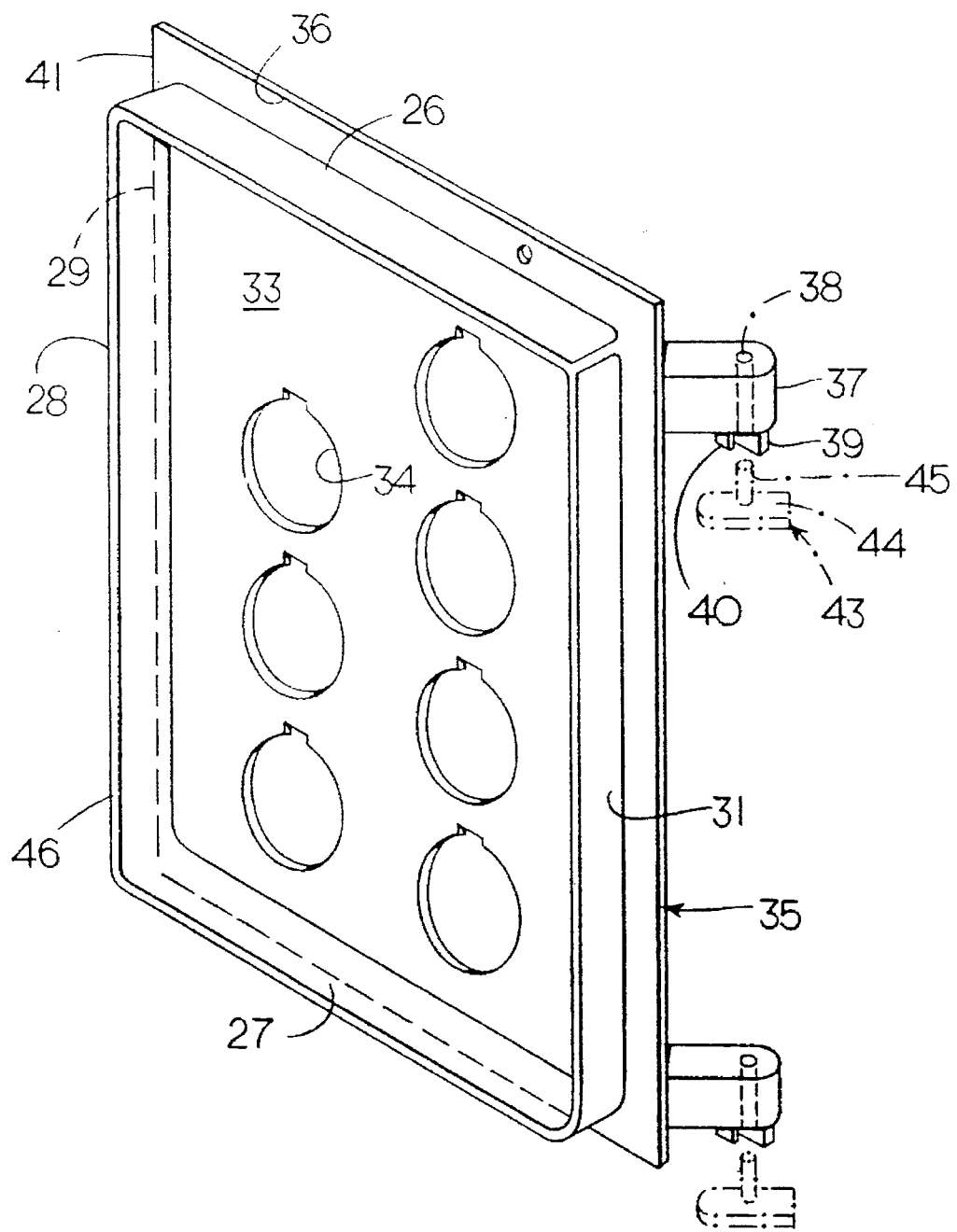
FIG. 4 is an enlarged front perspective view of the pilot device bracket used within the motor control center of the invention.

The details of the pilot bracket 17 are best seen by now referring to FIG. 4. The cut-outs 34 that support the indicator lamps 19 and push buttons 20 shown earlier in FIG. 1 are formed in the integrally-formed plastic plate 33 that defines top and bottom edges 26, 27 and opposing side edges 28, 31. The side extension 41 forms the elongated groove 29 shown in FIG. 3 by overlapping the part of the perimeter 36 that runs along the side edge 28. The raised ridge 46 on the left side of the bracket serves as a jam for the door if the user attempts to close the door over the face of the bracket instead of catching in the side extension 41. The hinge 37 projects from the back surface of the perimeter 36 and includes a thru-hole 38 that terminates at the bottom of the hinge next to a stop 39 on the back surface and a projection 40 on the front surface thereof. The metal hinge support 43 shown earlier in FIG. 2 includes a flat hinge plate 44 with an upstanding post 40 that is received within the thru-hole 38. The bottom of the hinge 37 sits on the flat plate and is supported thereon. As the pilot bracket rotates in the counter-clockwise direction when the door 12 is initially opened, as viewed in FIG. 2, the projection 40 cams the bottom of the hinge away from the hinge plate to hold the pilot bracket in position for interaction with the edge 18A of the rectangular slot 18, when the door 12 is later rotated back to the closed position shown in FIG. 1. The projection 40 also serves to retain the pilot bracket in the fully-opened position shown in phantom in FIG. 2, when the pilot bracket is fully rotated in the counter-clockwise direction. The stop 39 serves as a spring load to prevent the pilot bracket from being pushed behind the front plane of the unit in order to keep the pilot bracket from interfering with devices behind the pilot bracket.

A motor control center containing both essential components such as contactors and circuit breakers along with auxiliary components such as current transformers and terminals has herein been described. Pilot components such as indicator lamps and push buttons are positioned on a rotating pilot bracket that automatically swings away from the interior opening when the control center access door is opened.

We claim:

1. A motor control center comprising:

a cabinet having an open front part containing a door;

motor control components within a first part of said cabinet;

auxiliary electrical components within a second part of said cabinet;

pilot components arranged on a pilot bracket in front of said auxiliary electrical components, said pilot components being arranged within a slot formed within said cabinet door, said pilot bracket comprising a plate having a plurality of thru-holes for supporting said pilot components, said pilot bracket further includes a hinge extending from a first edge, said hinge being supported on a hinge support plate attached to said cabinet.

2. The motor control center of claim 1 wherein said motor control components include a motor contactor.

3. The motor control center of claim 1 wherein said auxiliary electrical components include a current transformer.

4. The motor control center of claim 1 wherein said hinge support plate includes an upstanding post, extending within a thru-hold formed within said hinge.

5. The motor control center of claim 4 wherein said hinge includes a stop on a bottom thereof, said stop interacting with said hinge support plate to position said pilot bracket within said control center door.

6. The motor control center of claim 1 wherein said pilot bracket includes means on one end arranged for interacting with an edge of said cabinet door slot to move said pilot bracket in unison with said cabinet door.

7. The motor control center of claim 6 wherein said interacting means comprises a side extension on said pilot bracket.

8. The motor control center of claim 7 wherein said side extension defines an extended slot and wherein said edge of said cabinet door slot is captured within said extended slot when said cabinet door is rotated to a closed position.

9. The motor control center of claim 2 wherein said pilot bracket includes an outer perimeter.

10. The motor control center of claim 5 wherein said hinge further includes a projection on said bottom surface for interacting with said bottom surface to retain said pilot bracket in a fully-open position.

* * * * *